United States Patent
Tojigamori et al.

(10) Patent No.: US 10,693,132 B2
(45) Date of Patent: Jun. 23, 2020

(54) ALL-SOLID-STATE BATTERY

(71) Applicant: TOYOTA JIDOSHA KABUSHIKI KAISHA, Toyota-shi, Aichi-ken (JP)

(72) Inventors: Takeshi Tojigamori, Susono (JP); Keita Sekizawa, Nagakute (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 177 days.

(21) Appl. No.: 15/982,045

(22) Filed: May 17, 2018

(65) Prior Publication Data
US 2018/0351167 A1    Dec. 6, 2018

(30) Foreign Application Priority Data
May 31, 2017   (JP) .................................. 2017-108314

(51) Int. Cl.
| | |
|---|---|
| *H01M 4/134* | (2010.01) |
| *H01M 4/136* | (2010.01) |
| *H01M 4/36* | (2006.01) |
| *H01M 4/38* | (2006.01) |
| *H01M 4/485* | (2010.01) |

(Continued)

(52) U.S. Cl.
CPC ........... *H01M 4/366* (2013.01); *H01M 4/134* (2013.01); *H01M 4/136* (2013.01); *H01M 4/386* (2013.01); *H01M 4/485* (2013.01); *H01M 4/602* (2013.01); *H01M 4/62* (2013.01); *H01M 4/625* (2013.01); *H01M 10/052* (2013.01);

(Continued)

(58) Field of Classification Search
CPC ................................. H01M 2300/0065–0082
See application file for complete search history.

(56) References Cited

U.S. PATENT DOCUMENTS

| | | | | |
|---|---|---|---|---|
| 2012/0183851 A1* | 7/2012 | Hara | ..................... | H01M 4/136 429/211 |
| 2012/0189914 A1* | 7/2012 | Hara | ..................... | H01M 4/136 429/211 |

(Continued)

FOREIGN PATENT DOCUMENTS

| | | |
|---|---|---|
| JP | 2005-317447 A | 11/2005 |
| JP | 2011-165410 A | 8/2011 |

(Continued)

OTHER PUBLICATIONS

JP2014235909A—Machine translation (Year: 2014).*

(Continued)

*Primary Examiner* — Haroon S. Sheikh
(74) *Attorney, Agent, or Firm* — Sughrue Mion, PLLC (57) ABSTRACT

A main object of the present disclosure is to provide an all-solid-state battery with an excellent capacity durability. The present disclosure achieve the object by providing an all-solid-state battery comprising: a cathode active material layer, an anode active material layer, and a solid electrolyte layer formed between the cathode active material layer and the anode active material layer; wherein at least one of the cathode active material layer and the anode active material layer contains a sulfide solid electrolyte and a conductive auxiliary material; the conductive auxiliary material includes a carbon material C1 having a carboxyl group on its surface; and a weight ratio of the carboxyl group to overall of the carbon material C1 is 8 weight % or more.

4 Claims, 2 Drawing Sheets

(51) Int. Cl.
  *H01M 4/60* (2006.01)
  *H01M 4/62* (2006.01)
  *H01M 10/0562* (2010.01)
  *H01M 10/052* (2010.01)

(52) U.S. Cl.
  CPC .. *H01M 10/0562* (2013.01); *H01M 2300/008* (2013.01); *H01M 2300/0068* (2013.01)

(56) References Cited

U.S. PATENT DOCUMENTS

2014/0170484 A1    6/2014  Fukahori
2016/0293960 A1*  10/2016  Kim ..................... H01M 4/625
2018/0090748 A1*   3/2018  Mochizuki .............. H01M 4/13

FOREIGN PATENT DOCUMENTS

JP    2012-099225 A    5/2012
JP    2014-120459 A    6/2014
JP    2015-181089 A   10/2015

OTHER PUBLICATIONS

Akira Yamashita et al.: "Modification of Functional Group on Porous Carbon Materials and Its Characteristics—Effect on Capacitance-", Journal of SCCJ vol. 27, No. 8, pp. 461-468, 2006.

* cited by examiner

ALL-SOLID-STATE BATTERY

TECHNICAL FIELD

The present disclosure relates to an all-solid-state battery with excellent capacity durability.

BACKGROUND ART

In accordance with a rapid spread of information relevant apparatuses and communication apparatuses such as a personal computer, a video camera and a portable telephone in recent years, the development of a battery to be used as a power source thereof has been emphasized. The development of a high-output and high-capacity battery for an electric automobile or a hybrid automobile has been advanced also in the automobile industry. A lithium battery has been presently noticed from the viewpoint of high energy density among various kinds of batteries.

Liquid electrolyte containing a flammable organic solvent is used for a presently commercialized lithium battery, so that the installation of a safety device for restraining temperature rise during a short circuit and the structure for preventing the short circuit are necessary therefor. On the contrary, a lithium battery, namely a battery all-solidified by replacing the liquid electrolyte with a solid electrolyte layer, is conceived to intend the simplification of the safety device and be excellent in production cost and productivity for the reason that the flammable organic solvent is not used in the battery.

In a lithium ion battery, in order to improve electron conductivity in an active material layer, a configuration known is to further include a conductive auxiliary material in addition to an active material. For example, Patent Literature 1 discloses a configuration of an anode active material layer, the configuration that includes, as an anode active material, at least one kind of a group consisting of a simple substance, an alloy, and a compound of a metal element, and a simple substance, an alloy, and a compound of a metalloid element, as well as a carbon material including oxygen of over 0.2 weight % as a conductive auxiliary material. Also, Patent Literature 1 discloses a technique to improve dispersibility of a carbon material to an anode active material layer by conducting an oxidization treatment to the carbon material. Also, for example, Patent Literature 2 discloses a technique to introduce a hydroxyl group, a carboxy group, and an ether bond to the surface of a conductive carbon by conducting a treatment such as a high oxidization treatment to the conductive carbon that is used as a conductive auxiliary material.

CITATION LIST

Patent Literatures

Patent Literature 1: Japanese Patent Application Publication (JP-A) No. 2005-317447
Patent Literature 2: JP-A No. 2015-181089

SUMMARY OF DISCLOSURE

Technical Problem

Now, in a lithium ion battery, lithium ions move from a cathode active material layer to an anode active material layer during charging process, and from the anode active material layer to the cathode active material layer during discharging process. In the charging and discharging processes, active materials in the cathode active material layer and the anode active material layer expand and contract along with the transfer of the lithium ions. Then, in the case of an all-solid-state battery, the expansion and contraction stress of the active materials are rarely softened, and thus a peel-off and a crack in the solid interface occur which results in decreasing the capacity durability.

The present disclosure has been made in view of the above circumstances, and a main object thereof is to provide an all-solid-state battery with excellent capacity durability.

Solution to Problem

In order to achieve the object, the present disclosure provides an all-solid-state battery comprising: a cathode active material layer, an anode active material layer, and a solid electrolyte layer formed between the cathode active material layer and the anode active material layer; wherein at least one of the cathode active material layer and the anode active material layer contains a sulfide solid electrolyte and a conductive auxiliary material; the conductive auxiliary material includes a carbon material C1 having a carboxyl group on its surface; and a weight ratio of the carboxyl group to overall of the carbon material C1 is 8 weight % or more.

According to the present disclosure, the conductive auxiliary material includes the carbon material C1 having a carboxyl group on its surface, so as to allow an all-solid-state battery to have excellent capacity durability.

In the disclosure, it is preferable that the conductive auxiliary material further contains a cup-stacked-type carbon nanofiber as a carbon material C2.

In the disclosure, it is preferable that the anode active material layer contains a metal active material, the sulfide solid electrolyte, and the conductive auxiliary material.

In the disclosure, it is preferable that the metal active material includes a Si element.

Advantageous Effects of Disclosure

The all-solid-state battery of the present disclosure exhibits effects such as excellent capacity durability.

DESCRIPTION OF EMBODIMENTS

The all-solid-state battery of the present disclosure is hereinafter described in detail.

Figure 1:
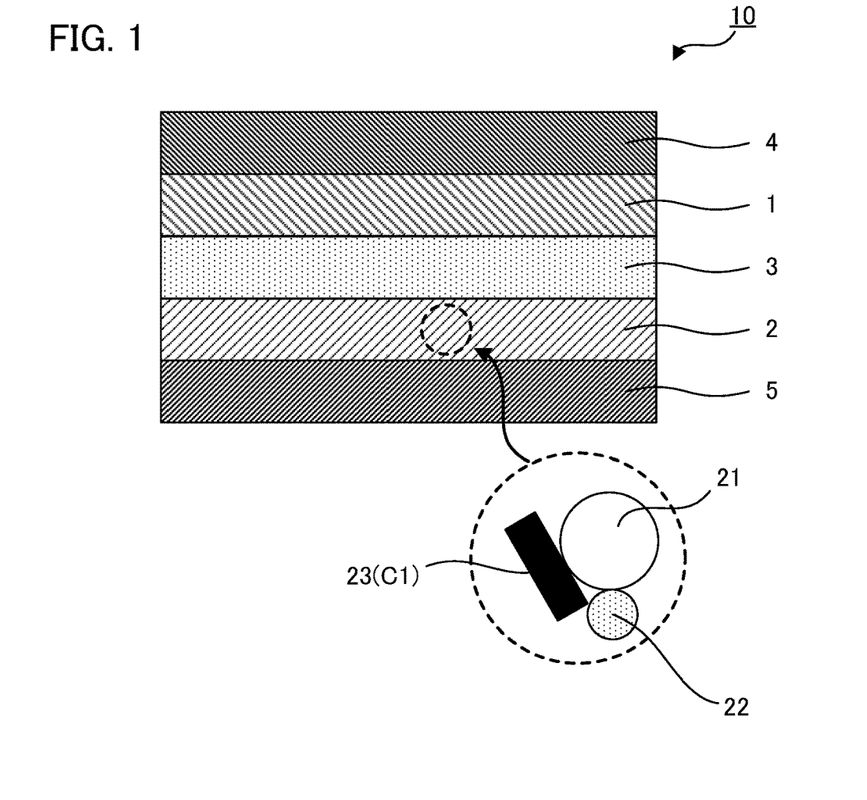
FIG. 1 is a schematic cross-sectional view illustrating an example of the all-solid-state battery of the present disclosure.

FIG. 1 is a schematic cross-sectional view illustrating an example of the all-solid-state battery of the present disclosure. All-solid-state battery 10 illustrated in FIG. 1 has cathode active material layer 1, anode active material layer 2, and solid electrolyte layer 3 formed between cathode active material layer 1 and anode active material layer 2. Also, all-solid-state battery 10 has cathode current collector 4 for collecting currents of cathode active material layer 1, and anode current collector 5 for collecting currents of anode active material layer 2. In addition, anode active material layer 2 includes anode active material 21 as well as sulfide solid electrolyte 22 and conductive auxiliary material 23. Conductive auxiliary material 23 includes carbon material C1 having a carboxyl group on its surface. In the carbon material C1, a weight ratio of the carboxyl group to overall of the carbon material C1 is 8 weight % or more. In the carbon material C1, compare to generally known carbon materials used as conductive auxiliary materials, more carboxyl groups are present on its surface.

According to the present disclosure, the conductive auxiliary material includes the carbon material C1 having a carboxyl group on its surface, so as to allow an all-solid-state battery to have excellent capacity durability.

In a lithium ion battery, lithium ions move from a cathode active material layer to an anode active material layer during charging process, and from the anode active material layer to the cathode active material layer during discharging process. In the charging and discharging processes, active materials in the cathode active material layer and the anode active material layer expand and contract along with the transfer of the lithium ions. In charging and discharging cycles, if the expansion and contraction of the active materials are repeated, the stacked structure of the battery is disordered due to the stress, and a void caused by a peel-off and a crack on the solid surface appears.

In the case of a liquid-based battery using an organic liquid electrolyte, the stress of the expansion and contraction of the active materials are softened by the fluidity of the organic liquid electrolyte; however, in the case of an all-solid-state battery using a solid electrolyte, the stress of the expansion and contraction of the active materials are rarely softened.

An all-solid-state battery functions as a battery since in the active material layer, lithium ion conduction occurs in the interface that the active material contacts with the solid electrolyte, and electron conduction occurs in the interface that the active material contacts with the conductive auxiliary material. Then, in the active material layer, when a void caused by a peel-off and a crack in the solid interface appears due to repeated expansion and contraction of the active materials during charging and discharging cycles, the contact of the active materials with the conductive auxiliary material is presumably lost. In this case, the active materials may take in lithium ions but may not take out electrons, which results in presumable failure to contribute to charge and discharge of the battery. Such electrical isolation of the active materials is presumably a cause of the deterioration of the battery capacity. As described above, in an all-solid-state battery, since the stress of expansion and contraction of the active materials are rarely softened, the effect of the expansion and contraction of the active materials to the capacity deterioration of the all-solid-state battery is especially large.

Such capacity deterioration due to the electrical isolation of the active material may be lowered by strengthening the confining pressure for keeping the stacked structure of the all-solid-state battery; however to strengthen the confining pressure, a hard restraining member that does not easily change its form is necessary. Then, in the case of using a restraining member in an all-solid-state battery, the cost becomes high, and the weight of the all-solid-state battery becomes heavy; thus, there is a practical problem. Also, if the amount of the conductive auxiliary material is made large, the interface of which the active material contacts with the conductive auxiliary material becomes large, so that the capacity deterioration may be inhibited; however, from the viewpoint of cost and volume energy density, the amount of the conductive auxiliary material is preferably small. Accordingly, it is desired to develop the auxiliary conductive material that allows the capacity deterioration to be inhibited and give the battery excellent capacity durability even with the small content.

To solve this problem, the inventors of the present disclosure found out that, as a conductive auxiliary material, the usage of a carbon material C1 that contains a lot of carboxyl groups on its surface allowed an all-solid-state battery to have excellent capacity durability.

The reason why the effect was obtained is presumed as follows.

The surface of an active material usually has polarity for some reason. As an example, the surface of an active material has a functional group with polarity (such as a hydroxyl group (OH group)) and thus have a polarity of the functional group (for example, polarity of $\delta+$ in the case of OH group). Also, as an additional example, a film of an oxide is formed on the surface of an active material and thus have polarity of $\delta-$ of the O element.

Figure 2A:
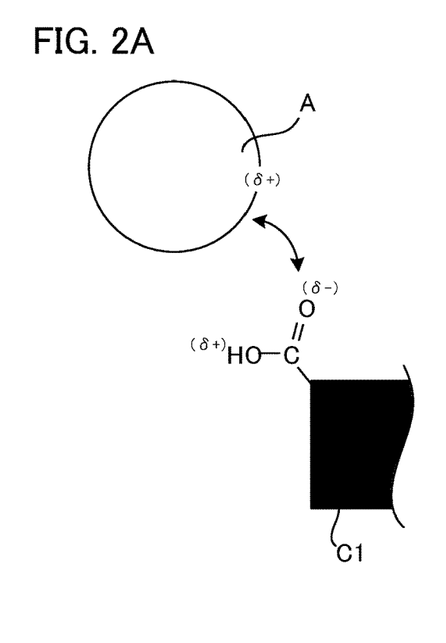
FIGS. 2A and 2B are views explaining a presumable mechanism in the present disclosure.
Figure 2B:
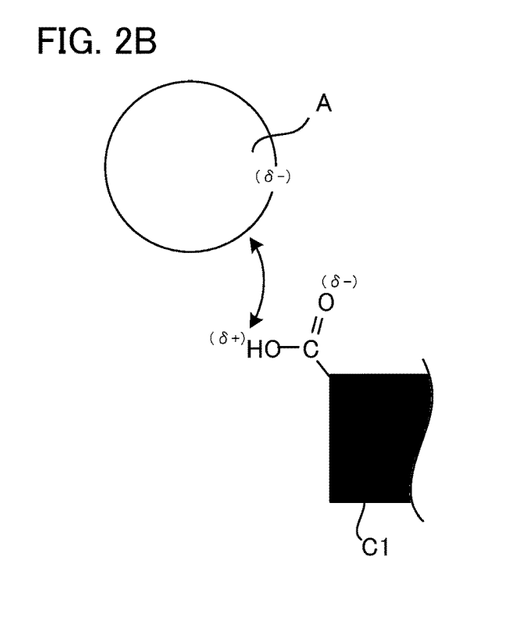

Meanwhile, as illustrated in FIGS. 2A and 2B, the carboxyl group on the surface of the carbon material C1 has polarity of $\delta-$ in the part of C=O, and has polarity of $\delta+$ in the part of C—OH. Accordingly, for example, as illustrated in FIG. 2A, when the surface of active material A has polarity of $\delta+$, chemisorption is caused by electrical interaction with the part of C=O that has polarity of $\delta-$, and thus the adhesion of active material A to the carbon material C1 may be strong. On the other hand, for example, as illustrated in FIG. 2B, if the surface of active material A has polarity of $\delta-$, chemisorption is caused by electrical interaction with the part of C—OH that has polarity of $\delta+$, and thus the adhesion of active material A to the carbon material C1 may be strong.

Incidentally, in FIGS. 2A and 2B, the cases the surface of active material A has polarity of $\delta+$ and polarity of $\delta-$ are separately explained; however, when the parts having polarity of $\delta+$ and $\delta-$ coexist on the surface of an active material, it is presumed that the part of C=O and the part of C—OH of the carboxyl group respectively interact.

Also, since polarity is usually generated on the surface of a current collector, it is presumed that the adhesion of the current collector to the carbon material C1 may also be strong.

Therefore, even when the stacked structure of the all-solid-state battery is disordered in the process of the expansion and contraction, the above described chemisorption prevents the carbon material C1 from easily being peeled off from the active material and the current collector; thus, the path for electrons to move from the active material to the current collector may be maintained and the capacity deterioration is presumably inhibited.

The idea of utilizing the chemisorption by a carboxyl group to have favorable adhesion of the active material to the conductive auxiliary material is not at all disclosed or suggested in Patent Literature 1 and Patent Literature 2.

Also, the reason why the above described effect may be obtained is presumed as follows.

General carbon materials used as conductive auxiliary materials are constituted with the unsaturated linkage of carbon-carbon, so that a n orbital is present in the vertical direction to the carbon skeleton. This n orbital is stabled by overlapping with the n orbital of the neighbor molecules, so that intermolecular force works in the manner the carbon materials are attracted to each other. General carbon materials are easily aggregated by this interaction; thus, it is not easily dispersed when it is mixed with a solvent. On the other hand, as like the carbon material C1 in the present disclosure, when a carboxyl group is present on its surface, dipole moment is generated on the surface. In a polar solvent, this dipole moment interacts with the dipole moment of the solvent molecule, so as to cause the solvation of the carbon material C1 and the solvent molecule. As the result, the cohesion of the n orbitals caused by the interaction is released, and the dispersibility of the carbon material C1 improves. The carbon material C1 in the present disclosure has a lot of carboxyl groups on its surface, so as to give favorable dispersibility of the conductive auxiliary material in the slurry in which the active material and the conductive auxiliary material including the carbon material C1 are mixed. Accordingly, the active material layer may have large surface on which the active material and the current collector contact with the conductive auxiliary material. Thereby, the conducting path of the active material and the current collector to the conductive auxiliary material may be increased; thus, the capacity deterioration may be inhibited even with the small content of the conductive auxiliary material, which presumably allows excellent capacity durability.

Incidentally, Patent Literatures 1 and 2 describe the technique of an oxidation treatment by soaking a general carbon material such as VGCF, acetylene black, and Ketjen black in a nitric acid solution. Also, Patent Literature 2 describes that a carboxyl group, a hydroxyl group, and an ether group may be introduced to the surface of a carbon material by conducting the oxidation treatment to a general carbon material; however, the weight ratio of the carboxyl group introduced to the surface of the carbon material in a general oxidation treatment is usually smaller than the weight ratio of the carboxyl group in the present disclosure.

For example, disclosed in the article by Akira Yamashita et al., "Modification of Functional Group on Porous Carbon Materials and Its Characteristics—Effect on Capacitance-", Journal of SCCJ Vol. 27, No. 8, pp. 461-468, 2006 is a material (ACF-EO) produced by electrically oxidizing a commercially available phenolic resin-based active carbon fiber (ACF) while applying 3 V of direct voltage thereto in $HNO_3$ aqueous solution of 0.1 mol/l. Table 1 in the article discloses that the ratio of the total acid groups in ACF-EO (Total Acidity (mmol/g)) is 1.76 mmol/g, and the ratio of the carboxyl group (—COOH) and the hydroxyl group (—OH) in the acid group is COOH: OH=56.2:43.8 in the molar ratio. From these numeric values, the weight ratio of the carboxyl group to overall of ACF-EO is calculated to be approximately 4.5 weight %. The electric oxidation in the article is a strong oxidation treatment among the oxidations performed to carbon materials; usually, the weight ratio of the carboxyl group introduced to the surface of a carbon material in general oxidation treatments is smaller than this value.

The all-solid-state battery of the present disclosure is hereinafter described in each constitution.

1. Cathode Active Material Layer and Anode Active Material Layer

At least one of the cathode active material layer and the anode active material layer in the present disclosure contains a sulfide solid electrolyte and a conductive auxiliary material.

(1) Conductive Auxiliary Material

The conductive auxiliary material in the present disclosure includes at least a carbon material C1 having a specific amount of carboxyl group on its surface.

(i) Carbon Material C1

The carbon material C1 in the present disclosure has a carboxyl group on its surface, and the weight ratio of the carboxyl group to overall of the carbon material C1 is 8 weight % or more.

In the present disclosure, the weight ratio of the carboxyl group to overall of the carbon material C1 is, usually 8 weight % or more, may be 9 weight % or more, and may be 10 weight % or more. Also, the weight ratio of the carboxyl group is, for example, 20 weight % or less, and may be 15 weight % or less.

There are no particular limitations on the method for measuring the weight ratio of the carboxyl group to overall of the carbon material C1, and examples thereof may include ICP (Inductive Coupling Plasma) emission spectrometry, Raman spectroscopy, and Fourier-transform infrared spectroscopy.

The carbon material C1 may have a specific carboxyl group on its surface; it may have only a carboxyl group, and may further have an additional functional group other than the carboxyl group. The proportion of the carboxyl group to all the functional groups on the surface of the carbon material C1 may be, for example, 70 mol % or more, may be 80 mol % or more, and may be 90 mol % or more.

Examples of the shape of the carbon material C1 may include a fiber shape and a granular shape. The average length of the carbon material C1 may be, for example, 0.5 µm or more and 200 µm or less, and may be 1 µm or more and 50 µm or less. The average length of the carbon material C1 may be determined by measuring the length of 50 or more of the carbon material C1 from the observation image by a scanning electron microscope (SEM), and calculating the average value.

Examples of the carbon material C1 may include carboxylic acid functionalized multi-walled carbon nanotube from Sigma-Aldrich Co. LLC. (Product number: 755125).

The conductive auxiliary material in the present disclosure may include at least the above described carbon material C1; it may include only the above described carbon material C1, and may further include an additional conductive material.

The weight ratio of the carbon material C1 to overall of the conductive auxiliary material is, for example, preferably 50 weight % or more, may be 70 weight % or more, and may be 90 weight % or more.

There are no particular limitations on the additional conductive material if it functions as a conductive auxiliary material, but it is preferable that the later described cup-stacked-type carbon nanofiber is further included as a carbon material C2.

(ii) Carbon Material C2

In the present disclosure, the conductive auxiliary material may further include a carbon material C2 that differs from the carbon material C1. The weight ratio of a carboxyl group on its surface to overall of the carbon material C2 is usually less than 8 weight %. In the present disclosure, the carbon material C2 is preferably a cup-stacked-type carbon nanofiber.

The cup-stacked-type carbon nanofiber is a kind of carbon materials, but it is not simple cylindrical shape such as the shape of single-layered carbon nanotube and a multi-layered carbon nanotube. The cup-stacked-type carbon nanotube has a structure in which a multiple of nanographite structure in a cup-shape or an umbrella-shape having inclined basal planes, are stacked. Also, less basal planes and more edge surfaces are present in the cup-stacked-type carbon nanofiber has compared to simple cylindrical-shaped carbon material.

The shape of the cup-stacked-type carbon nanofiber is usually a fiber shape. The average length of the cup-stacked-type carbon nanofiber may be, for example, shorter than the length of the above described carbon material C1, may be the same length as that of the carbon material C1, and may be longer than the average length of the carbon material C1. In the present disclosure, above all, the average length of the cup-stacked-type carbon nanofiber is preferably longer than the average length of the carbon material C1. The capacity durability of an all-solid-state battery may be further excellent by mixing (conjugating) the cup-stacked-type carbon nanofiber having long fiber length with the carbon material C1, which presumably make the electron conducting path not easily be cut off. Also, it is presumed that the electron conducting path in a long distance may be formed, and the electron moving path from the current collector may be easily secured.

The average length of the cup-stacked-type carbon nanofiber may be, for example, with respect to the average length of the carbon material C1, 10 times or more, may be 13 times or more, and may be 15 times or more. Also, The average length of the cup-stacked-type carbon nanofiber may be, for example, with respect to the average length of the carbon material C1, 150 times or less, may be 130 times or less, and may be 100 times or less.

The average length of the cup-stacked-type carbon nanofiber may be, for example, 20 μm or more, may be 50 μm or more, and may be 100 μm or more. Also, the average length of the cup-stacked-type carbon nanofiber may be, for example, 300 μm or less, may be 200 μm or less, and may be 150 μm or less.

The method for measuring the average length of the cup-stacked-type carbon nanofiber may be the same method for measuring the average length of "(i) Carbon material C1" described above; thus, the description herein is omitted.

Specific examples of the cup-stacked-type carbon nanofiber may include cup-stacked-type carbon nanofiber (CNF) from Sigma-Aldrich Co. LLC., and Carbere™ from GSI Creos Corporation.

There are no particular limitations on the method for detecting the inclusion of the cup-stacked-type carbon nanofiber in the active material layer if it is a general method. Examples thereof may include a method by the observation with TEM (transmission electron microscope).

The cup-stacked-type carbon nanofiber may have a polar functional group on its surface. In the cup-stacked-type carbon nanofiber, a polar functional group may be easily included since there are many edge surfaces. Examples of the polar functional group may include an oxygen containing functional group, a nitrogen containing functional group, a sulfur containing functional group, and a halogen containing functional group. The polar functional group is, above all, preferably an oxygen containing functional group. The reason therefor is to favorably adsorb the cup-stacked-type carbon nanofiber to the surface of an active material, since the oxygen has especially higher electronegativity than that of the carbon in the oxygen containing functional group. Also, the dipole moment in the surface of the cup-stacked-type carbon nanofiber may be large, and thus the dispersibility to the active material layer may be favorable.

Examples of the oxygen containing functional group may include a carboxyl group (—COOH), a carbonyl group (—C(=O)—), a hydroxyl group (—OH), and an ether group (—C—O—C—).

The weight ratio of the oxygen containing functional group to the overall of the cup-stacked-type carbon nanofiber is, for example, preferably in a range of 0.01 weight % to 20 weight %. There are no particular limitations on the method for measuring the content of the oxygen containing functional group in the cup-stacked-type carbon nanofiber if it is a general method. Examples thereof may include methods such as ICP emission spectrometry, Raman spectroscopy, and Fourier-transform infrared spectroscopy.

The cup-stacked-type carbon nanofiber may be the one an oxidation treatment is performed to its surface. Examples of the method for the oxidation treatment may include a heat treatment in oxygen containing gas atmosphere like air atmosphere, a wet chemical oxidation treatment by an oxidizer, a photooxidation treatment by irradiating an ultraviolet light, an oxygen plasma treatment, and an ozone treatment. In the heat treatment in oxygen containing gas atmosphere, the heating temperature is preferably in a range of 100° C. to 600° C., and above all, preferably in a range of 250° C. to 400° C. The reason therefor is that if the heating temperature is too low, it may possibly be difficult to form the oxygen containing functional group. Also, if the heating temperature is too high, the fiber length of the carbon material may possibly be short. Also, if the heating temperature exceeds 600° C., the carbon material may possibly be burned and eliminated.

When the conductive auxiliary material further contains a cup-stacked-type carbon nanofiber as the carbon material C2, the weight ratio of the carbon material C2 to the overall of the conductive auxiliary material may be, for example, 10 weight % or more, and may be 25 weight % or more. Also, the weight ratio of the carbon material C2 may be, 50 weight % or less, and may be 40 weight % or less.

Also, when the conductive auxiliary material further contains the carbon material C2, the weight ratio (C1/(C1+C2)) of the carbon material C1 to the total weight of the carbon material C1 and the carbon material C2 (C1+C2) is, preferably 20 weight % or more, and more preferably 40 weight % or more.

(iii) Conductive Auxiliary Material

In the present disclosure, at least one of the cathode active material layer and the anode active material layer contains the above described conductive auxiliary material. There are no particular limitations on the content of the conductive auxiliary material in the cathode active material layer or the anode active material layer if it is to the extent that allows excellent capacity durability. The content is preferably in a range of 1 weight % to 20 weight %, more preferably in a range of 2 weight % to 15 weight %, and further preferably in a range of 3 weight % to 10 weight %. The reason therefor is that if the content of the conductive auxiliary material is too much, the volume energy density of the electrode may possibly be degraded, and if it is too little, the electron conducting path may not possibly be sufficiently formed.

(2) Cathode Active Material Layer

The cathode active material layer in the present disclosure is a layer that contains at least a cathode active material, and may further contain at least one of a solid electrolyte, the above described conductive auxiliary material, and a binder, as required.

Examples of the cathode active material may include oxide active materials and sulfide active materials. Examples of the oxide active material may include a rock-salt-bed-type active material such as $LiCoO_2$, $LiMnO_2$, $LiNiO_2$, $LiVO_2$, and $LiNi_{1/3}Co_{1/3}Mn_{1/3}O_2$; a spinel type active material such as $LiMn_2O_4$, $Li_4Ti_5O_{12}$, and $Li(Ni_{0.5}Mn_{1.5})O_4$; and an olivine type active material such as LiFePO$_4$, LiMnPO$_4$, LiNiPO$_4$, and LiCoPO$_4$. Also, as the oxide active material, materials such as a LiMn spinel active material represented by Li$_{1+x}$Mn$_{2-x-y}$M$_y$O$_4$ (M is at least one kind of Al, Mg, Co, Fe, Ni, and Zn; 0<x+y<2), and lithium titanate may be used.

The shape of the cathode active material may be, for example, a granular shape and a thin film shape. Also, there are no particular limitations on the content of the cathode active material in the cathode active material layer. For example, the content may be in a range of 40 weight % to 99 weight %.

Also, a coating layer comprising a Li ion conductive oxide is preferably formed on the surface of the cathode active material. The reason therefor is to inhibit the reaction of the cathode active material with a solid electrolyte. Examples of the Li ion conductive oxide may include LiNbO$_3$, Li$_4$Ti$_5$O$_{12}$, and Li$_3$PO$_4$. The thickness of the coating layer is, for example, in a range of 0.1 nm to 100 nm, and preferably in a range of 1 nm to 20 nm. The coverage of the coating layer on the surface of the cathode active material is, for example, 50% or more, and preferably 80% or more.

Examples of the solid electrolyte may include an inorganic solid electrolyte such as a sulfide solid electrolyte. In the present disclosure, if the cathode active material layer contains the above described conductive auxiliary material, usually, a sulfide solid electrolyte is further included as the solid electrolyte. Here, if a sulfide solid electrolyte is used, for example, there is a risk that the sulfide solid electrolyte may be deteriorated due to the ion-exchange reaction of the Li ions in the sulfide solid electrolyte with the hydrogen ions in a hydroxyl group. The deterioration in the sulfide solid electrolyte may be a cause of degrading of the capacity durability of the all-solid-state battery. In the present disclosure, the carbon material C1 has a lot of carboxyl groups on its surface. In the carboxyl group, while the polarity thereof is in two sections that are C=O section and C-OH section, the reactive section with the sulfide solid electrolyte is mainly the H section (hydrogen ion) in the C-OH section; thus, there are a little of the reactive section even though there are a number of sections with polarity. Accordingly, since the carbon material C1 may chemisorb an active material utilizing also the polarity of the section of the carbonyl group that has no hydrogen ions, it is presumed that the necessary cohesion may be obtained even with a relatively small amount of the hydroxyl group on the surface. Thereby, the deterioration due to the reaction of the sulfide solid electrolyte with the hydroxyl group may be inhibited, and the capacity durability may be inhibited from being degraded.

Examples of the sulfide solid electrolyte may include Li$_2$S—P$_2$S$_5$, Li$_2$S—P$_2$S$_5$—Li$_3$PO$_4$, LiI—P$_2$S$_5$—Li$_3$PO$_4$, Li$_2$S—P$_2$S$_5$—LiI, Li$_2$S—P$_2$S$_5$—LiI—LiBr, Li$_2$S—P$_2$S$_5$—Li$_2$O, Li$_2$S—P$_2$S$_5$—Li$_2$O—LiI, Li$_2$S—P$_2$O$_5$, LiI—Li$_2$S—P$_2$O$_5$, Li$_2$S—SiS$_2$, Li$_2$S—SiS$_2$—LiI, Li$_2$S—SiS$_2$—LiBr, Li$_2$S—SiS$_2$—LiBr, Li$_2$S—SiS$_2$—LiCl, Li$_2$S—SiS$_2$—B$_2$S$_3$—LiI, Li$_2$S—SiS$_2$—P$_2$S$_5$—LiI, Li$_2$S—B$_2$S$_3$, Li$_2$S—P$_2$S$_5$—Z$_m$S$_n$ (provided that m and n is a positive number; Z is either one of Ge, Zn, and Ga), Li$_2$S—GeS$_2$, Li$_2$S—SiS$_2$—Li$_3$PO$_4$, and Li$_2$S—SiS$_2$—Li$_x$MO$_y$ (provided that x and y is a positive number; M is either one of P, Si, Ge, B, Al, Ga, and In). Incidentally, the description of "Li$_2$S—P$_2$S$_5$" above refers to a sulfide solid electrolyte comprising a raw material composition including Li$_2$S and P$_2$S$_5$, and likewise applies to the other descriptions.

In particular, the sulfide solid electrolyte is preferably provided with an ion conductor containing Li, A (A is at least one kind of P, Si, Ge, Al, and B), and S. In addition, the ion conductor preferably has an anion structure of an ortho composition (PS$_4^{3-}$ structure, SiS$_4^{4-}$ structure, GeS$_4^{4-}$ structure, AlS$_3^{3}$ structure, and BS$_3^{3-}$ structure) as the main component of the anion. The reason therefor is to allow the sulfide solid electrolyte to have high chemical stability. The proportion of the anion structure of an ortho composition to all the anion structures in the ion conductor is, preferably 70 mol % or more, and more preferably 90 mol % or more. The proportion of the anion structure of an ortho composition may be determined by a Raman spectroscopy, a NMR (Nuclear Magnetic Resonance) method, and a XPS (X-ray photoelectron spectroscopy) method.

The sulfide solid electrolyte may contain a lithium halide in addition to the ion conductor. Examples of the lithium halide may include LiF, LiCl, LiBr, and LiI, and among them, LiCl, LiBr, and LiI are preferable. The proportion of LiX (X=I, Cl, and Br) in the sulfide solid electrolyte is, for example, in a range of 5 mol % to 30 mol %, and preferably in a range of 15 mol % to 25 mol %. The proportion of LiX refers to the total proportion of LiX included in the sulfide solid electrolyte.

The sulfide solid electrolyte may be a crystalline material, and may be an amorphous material. Also, the sulfide solid electrolyte may be glass, and may be a crystalized glass (glass ceramic). Examples of the shape of the sulfide solid electrolyte may include a granular shape.

The weight ratio of the cathode active material and the solid electrolyte (active material/solid electrolyte) in the cathode active material layer is, for example, preferably in a range of 30/70 to 85/15, and may be in a range of 50/50 to 80/20.

Examples of the binder may include a rubber-based binder such as butylene rubber (BR) and styrene butadiene rubber (SBR); and a fluoride-based binder such as polyvinylidene fluoride (PVDF).

The thickness of the cathode active material layer is, for example, preferably in a range of 1 μm to 100 μm, and preferably in a range of 3 μm to 100 μm.

(3) Anode Active Material Layer

The anode active material layer in the present disclosure is a layer that contains at least an anode active material, and may further contain at least one of a solid electrolyte, the above described conductive auxiliary material, and a binder, as required. Above all, in the present disclosure, it is preferable that the anode active material layer contains the above described conductive auxiliary material.

There are no particular limitations on the anode active material if it may store and release a metal ion. Examples thereof may include a metal active material, a carbon active material, and an oxide active material. Examples of the metal active material may include a simple substance of metal and a metal alloy. Examples of the metal element included in the metal active material may include In, Al, Si, and Sn. The metal alloy is preferably an alloy that contains the above metal element as the main component. Examples of the Si alloy may include a Si—Al-based alloy, a Si—Sn-based alloy, a Si—In-based alloy, a Si—Ag-based alloy, a Si—Pb-based alloy, a Si—Sb-based alloy, a Si—Bi-based alloy, a Si—Mg-based alloy, a Si—Ca-based alloy, and a Si—Ge-based alloy. Incidentally, for example, the Si—Al-based alloy refers to an alloy that contains at least Si and Al; it may be an alloy containing only Si and Al, and may be an alloy containing an additional metal element other than those. Likewise applies to the alloys other than the Si—Al-based alloy. The metal alloy may be a two-component-based alloy, and may be a multi-component-based alloy of three components or more. There are no particular limitations on the carbon active material if it contains carbon. Examples thereof may include mesocarbon microbeads (MCMB), highly oriented pyrolytic graphite (HOPG), hard carbon, and soft carbon. Examples of the oxide active material may include $Nb_2O_5$, $Li_4Ti_5O_{12}$, and SiO.

The anode active material is preferably the metal active material, and above all, is preferably the metal active material including a Si element, a Sn element, an Al element, or an In element. When expansion and contraction of the active material are repeated in charge and discharge cycles, the volume expansion rate is high, and thus the effect of the capacity deterioration becomes large. For that reason, the effect of allowing the excellent capacity durability becomes remarkable. Also, the metal active material is preferably the metal active material containing a Si element among those described above. The volume expansion rate of the metal active material containing a Si element is extremely high. For example, when a simple substance of Si is used as the active material, the volume expansion rate becomes approximately 4 times. Accordingly, the effect of the capacity deterioration to the all-solid-state battery is particularly large. Also, the hydroxyl group on the surface of the metal active material containing a Si element may favorably interact with the carboxyl group on the surface of the carbon material C1, so as to allow the cohesion of the metal active material with the carbon material C1 to be particularly favorable.

The shape of the anode active material may be, for example, shapes such as a granular shape. Also, there are no particular limitations on the content of the anode active material in the anode active material layer; for example, it may be in a range of 40 weight % to 100 weight %.

The solid electrolyte and the binder used in the anode active material layer are in the same contents as those described for the cathode active material layer above.

The weight ratio of the anode active material and the solid electrolyte (active material/solid electrolyte) in the anode active material layer is, for example, preferably in a range of 30/70 to 85/15, and may be in a range of 40/60 to 80/20.

The thickness of the anode active material layer is, for example, preferably in a range of 1 μm to 100 μm, and preferably in a range of 20 μm to 100 μm.

2. Solid Electrolyte Layer

The solid electrolyte layer in the present disclosure is a layer formed between the cathode active material layer and the anode active material layer. Also, the solid electrolyte layer is a layer that contains at least a solid electrolyte, and may further contain a binder as required.

The solid electrolyte and the binder used in the solid electrolyte layer are in the same contents as those described cathode active material layer and the anode active material layer above. Also, the content of the solid electrolyte in the solid electrolyte layer is, for example, in a range of 10 weight % to 100 weight %, and preferably in a range of 50 weight % to 100 weight %. Also, the thickness of the solid electrolyte layer is, for example, in a range of 0.1 μm to 300 μm, and preferably in a range of 0.1 μm to 100 μm.

3. Other Constitutions

The all-solid-state battery of the present disclosure usually includes a cathode current collector for collecting currents of the cathode active material layer, and an anode current collector for collecting currents of the anode active material layer. Also, the all-solid-state battery is usually used in a state stored in a battery case. The cathode current collector, the anode current collector, and the battery case may be the same as those used for a general all-solid-state battery; thus, the descriptions herein are omitted.

4. All-Solid-State Battery

The all-solid-state battery of the present disclosure is, for example, an all solid lithium ion battery. The all-solid-state battery may be a primary battery and may be a secondary battery, but preferably a secondary battery among them, so as to be repeatedly charged and discharged, and useful as a car-mounted battery, for example. Incidentally, the primary battery includes the usage of a secondary battery as a primary battery (for the purpose of just discharging one time after charging). Examples of the shape of the all-solid-state battery may include a coin shape, a laminate shape, a cylindrical shape, and a square shape.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation thereto.

EXAMPLES

The present disclosure is hereinafter described in more details with reference to Examples.

Example 1

Production of Anode Active Material Layer

Prepared as the conductive auxiliary material was carboxylic acid functionalized multi-walled carbon nanotube of which surface carboxylated in 8 weight % or more (from Sigma-Aldrich Co. LLC., Product number: 755125, the average length of 1.5 μm, the weight ratio of the carboxyl group being 10.4 weight %, CNT-COOH). CNT-COOH corresponds to the carbon material C1.

Butyl butyrate, 5 weight % butyl butyrate solution of PVDF (polyvinylidene fluoride)-based binder (from KUREHA CORPORATION), Si (anode active material), the above described conductive auxiliary material, and a sulfide solid electrolyte ($Li_2S$—$P_2S_5$-based glass ceramic containing LiBr and LiI) were added to the container made of PP (polypropylene), and the container was agitated for 30 seconds by an ultrasonic dispersion apparatus (UH-50 from SMT Corporation). Next, the container was shaken by a shaker (TTM-1 from SIBATA SCIENTIFIC TECHNOLOGY LTD.) for 30 minutes. Thereby, an anode slurry was obtained.

The obtained anode slurry was applied to a Cu foil (from Furukawa Electric Co., Ltd.)(anode current collector) using an applicator by a blade method, and dried naturally. Next, the product was dried on a hot plate at 100° C. for 30 minutes. In this manner, an anode having the anode active material layer and the anode current collector was obtained.

Production of Cathode Active Material Layer $LiNi_{1/3}Mn_{1/3}Co_{1/3}O_2$ (cathode active material) was coated with $LiNbO_3$ (solid electrolyte) in an atmospheric environment using a tumbling fluidized bed granulating-coating machine (from Powrex Corporation). After that, the product was burned in an atmospheric environment, and thus the surface of $LiNi_{1/3}Mn_{1/3}Co_{1/3}O_2$ was coated with $LiNbO_3$.

Next, butyl butyrate, 5 weight % butyl butyrate solution of PVDF (polyvinylidene fluoride)-based binder (from KUREHA CORPORATION), $LiNi_{1/3}Mn_{1/3}Co_{1/3}O_2$ coated with $LiNbO_3$, VGCF™ (from SHOWA DENKO K.K)(conductive auxiliary material), and a sulfide solid electrolyte ($Li_2S$—$P_2S_5$-based glass ceramic containing LiBr and LiI)

were added to the container made of PP, and the container was agitated for 30 seconds by an ultrasonic dispersion apparatus (UH-50 from SMT Corporation). Next, the container was shaken by a shaker (TTM-1 from SIBATA SCIENTIFIC TECHNOLOGY LTD.) for 3 minutes, and further agitated by the ultrasonic dispersion apparatus for 30 seconds. Thereby, a cathode slurry was obtained.

The obtained cathode slurry was applied to an Al foil (from Nippon Foil Mfg. Co., Ltd.)(cathode current collector) using an applicator by a blade method, and dried naturally. Next, the product was dried on a hot plate at 100° C. for 30 minutes. In this manner, a cathode having the cathode active material layer and the cathode current collector was obtained.

Production of Solid Electrolyte Layer

Heptane, 5 weight % heptane solution of BR (butadiene)-based binder (from JSR Corporation), and a sulfide solid electrolyte material ($Li_2S$—$P_2S_5$-based glass ceramic containing LiBr and LiI) of which average particle size was 2.5 μm were added to a container made of PP, and the container was agitated for 30 seconds by an ultrasonic dispersion apparatus (UH-50 from SMT Corporation). Next, the container was shaken for 30 minutes by a shaker (TTM-1 from SIBATA SCIENTIFIC TECHNOLOGY LTD.). Thereby, a solid electrolyte slurry was obtained.

The obtained solid electrolyte slurry was applied to a substrate (Al foil) using an applicator by a blade method, and dried naturally. Next, the product was dried on a hot plate at 100° C. for 30 minutes. In this manner, a solid electrolyte layer formed on the substrate was obtained.

Production of Evaluation Battery

The solid electrolyte layer was put in a metal mold of 1 $cm^2$, and pressed at 1 ton/$cm^2$ (98 MPa). Next, the cathode was arranged on one side of the solid electrolyte layer, and pressed at 1 ton/$cm^2$ (98 MPa). Next, the anode was arranged on the other side of the solid electrolyte layer, and pressed at 6 ton/$cm^2$ (588 MPa). Thereby, a cell was produced. Then, the produced cell was confined at 10 MPa using a restraining member to produce an evaluation battery.

Example 2

An evaluation battery was produced in the same manner as in Example 1, except that the conductive auxiliary material below was used as the conductive auxiliary material in the anode active material layer.

The conductive auxiliary material used was obtained by mixing a carboxylic acid functionalized multi-walled carbon nanotube (from Sigma-Aldrich Co. LLC., the average length of 1.5 μm, the proportion of the carboxyl group being 10.4 weight %, CNT-COOH) and a cup-stacked-type carbon nanofiber (from Sigma-Aldrich Co. LLC., CNF) in the weight ratio of CNT-COOH:CNF=50:50. The CNF corresponds to the carbon material C2.

Comparative Example 1

An evaluation battery was produced in the same manner as in Example 1, except that a multi-layered carbon nanotube (from SHOWA DENKO K.K, VGCF™) was used as the conductive auxiliary material in the anode active material layer. The VGCF™ is a general carbon material used as a conductive auxiliary material.

Comparative Example 2

An evaluation battery was produced in the same manner as in Example 1, except that a cup-stacked-type carbon nanofiber (from Sigma-Aldrich Co. LLC., CNF) was used as the conductive auxiliary material in the anode active material layer.

Comparative Example 3

An evaluation battery was produced in the same manner as in Example 1, except that the conductive auxiliary material below was used as the conductive auxiliary material in the anode active material layer.

Powder of the cup-stacked-type carbon nanofiber used as the conductive auxiliary material in the anode active material layer in Comparative Example 2 was heat treated at 350° C. for 30 minutes in an air atmosphere, and thereby a surface-oxidized carbon nanofiber (CNFox) was synthesized. An evaluation battery was produced in the same manner as in Example 1, except that this CNFox was used as the conductive auxiliary material in the anode active material layer.

Evaluation

First, the initial discharge capacity was measured. In specific, the evaluation battery of Examples 1, 2, and Comparative Examples 1 to 3 was respectively charged in constant current—constant voltage (termination current: 1/100 C) at 3 hour rate (1/3 C) up to 4.4 V at the temperature of 25° C., and then discharged in constant current—constant voltage (termination current: 1/100 C) at 3 hour rate (1/3 C) down to 3.0 V. The discharge capacity at this time was measured as the initial discharge capacity.

Next, a durability test was conducted. In specific, the evaluation battery of Examples 1, 2, and Comparative Examples 1 to 3 was respectively charged at 0.5 hour rate (2 C) up to 4.2 V at the temperature of 60° C., and then discharged at 0.5 hour rate (2 C) down to 3.1 V as a cycle, and the cycle was repeated 150 times. After the durability test, the battery was charged in constant current—constant voltage (termination current: 1/100 C) at 3 hour rate (1/3 C) up to 4.4 V at the temperature of 25° C., and then discharged in constant current—constant voltage (termination current: 1/100 C) at 3 hour rate (1/3 C) down to 3.0 V. The discharge capacity at this time was measured as the discharge capacity after the durability test.

Then, the value of the discharge capacity after the durability test with respect to the initial discharge capacity was determined as the capacity durability (%) for each of the evaluation battery of Examples 1, 2, and Comparative Examples 1 to 3. The results are shown in Table 1 and a graph in FIG. 3.

TABLE 1

|  | Conductive auxiliary material | Capacity durability (%) |
| --- | --- | --- |
| Example 1 | CNT-COOH | 85.2 |
| Example 2 | CNT-COOH CNF | 87.7 |
| Comparative Example 1 | VGCF | 71.9 |
| Comparative Example 2 | CNF | 75.8 |
| Comparative Example 3 | CNFox | 80.6 |

Figure 3:
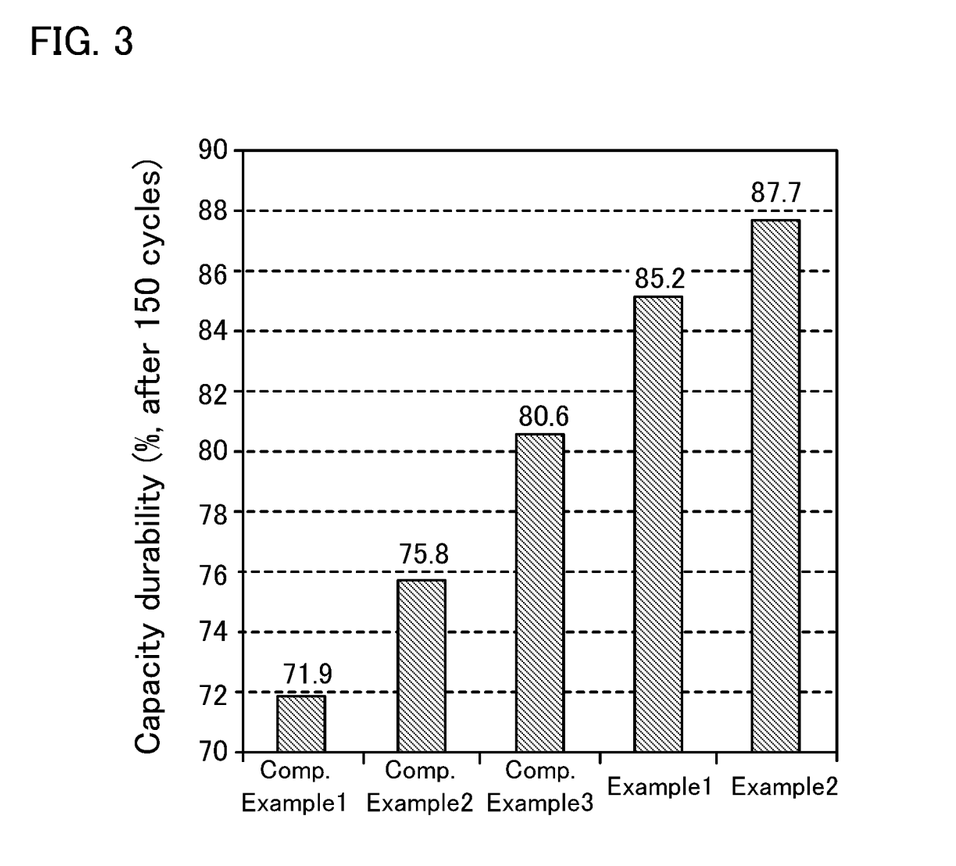
FIG. 3 is a graph showing the capacity durability in the evaluation batteries of Examples 1, 2, and Comparative Examples 1 to 3.

As shown in Table 1 and FIG. 3, it was confirmed that the capacity durability was higher in Example 1 using CNT-COOH than in Comparative Example 1 using VGCF. The surface of the VGCF is mainly basal plane and does not have polarity; however, the surface of the CNT-COOH is covered with the carboxyl group and has polarity. In Example 1, it is presumed that the carboxyl group of the CNT-COOH was bonded (chemisorbed) to the hydroxyl group (—OH group) in the surface of the Si active material, and thus the electron conducting path was strongly formed.

It was confirmed that the capacity durability of Example 2 in which a part of CNT-COOH was replaced with CNF was further higher than that of Example 1 using CNT-COOH.

From the results of the capacity durability of Example 1 using CNT-COOH and the capacity durability of Example 2 using CNF, it was presumed that the case of combining CNT-COOH and CNF would have higher capacity durability than that of Comparative Example 2, and lower capacity durability than that of Example 1. However, in Example 2 that used the combination of CNT-COOH and CNF, it was confirmed that the capacity durability was higher than that of Example 1.

The CNF has larger aspect ratio than that of CNT-COOH and is a long chain. In Example 2, it is presumed that the CNF having long chain was connecting the fibers of CNT-COOH adsorbed strongly to the Si active material, and thereby the electron conducting path was strongly formed.

From the results of Comparative Examples 2 and 3, it was confirmed that the capacity durability of Comparative Example 3 in which the oxidation treatment was conducted to CNF was 4.8% higher than that of Comparative Example 2 in which the oxidation treatment was not conducted.

Meanwhile, from the results of Example 1 and Comparative Example 1, it was confirmed that the capacity durability of Example 1 having 8 weight % or more of the carboxyl group on the surface was 3.3% higher than that of Comparative Example 1 not having a carboxyl group. From these results, it was suggested that the carbon material C1 having 8 weight % or more of the carboxyl group on its surface improved the capacity durability more remarkably than the carbon material to which an oxidation treatment was simply conducted. Also, it is presumed that the capacity durability improvement in Example 1 is a different effect made by bonding the active material with the conductive auxiliary material utilizing the chemisorption.

REFERENCE SIGNS LIST

1 . . . cathode active material layer
2 . . . anode active material layer
3 . . . solid electrolyte layer
4 . . . cathode current collector
5 . . . anode current collector
10 . . . all-solid-state battery
21 . . . anode active material
22 . . . sulfide solid electrolyte
23 . . . conductive auxiliary material
A . . . active material
C1 . . . Carbon material C1 having a carboxyl group on its surface

What is claimed is:

1. An all solid battery comprising: a cathode active material layer, an anode active material layer, and a solid electrolyte layer formed between the cathode active material layer and the anode active material layer;
   wherein at least one of the cathode active material layer and the anode active material layer contains a sulfide solid electrolyte and a conductive auxiliary material;
   the conductive auxiliary material includes a carbon material C1 having a carboxyl group on its surface; and
   a weight ratio of the carboxyl group to overall of the carbon material C1 is 8 weight % or more.

2. The all solid battery according to claim 1, wherein the conductive auxiliary material further contains a cup-stacked-type carbon nanofiber as a carbon material C2.

3. The all solid battery according to claim 1, wherein the anode active material layer contains a metal active material, the sulfide solid electrolyte, and the conductive auxiliary material.

4. The all solid battery according to claim 3, wherein the metal active material includes a Si element.

* * * * *